US007321550B2

(12) United States Patent
Kao et al.

(10) Patent No.: US 7,321,550 B2
(45) Date of Patent: Jan. 22, 2008

(54) METHOD OF EQUALIZATION IN AN OFDM SYSTEM

(75) Inventors: Yung-An Kao, Hsinchu (TW); Chang-Lung Hsiao, Hsinchu (TW); Po-Lin Chiu, Hsinchu (TW); Shih-Kai Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 879 days.

(21) Appl. No.: 10/778,087

(22) Filed: Feb. 17, 2004

(65) Prior Publication Data

US 2005/0180461 A1 Aug. 18, 2005

(51) Int. Cl.
*H04J 11/00* (2006.01)

(52) U.S. Cl. ............. 370/208; 375/260; 375/349; 375/229; 370/210

(58) Field of Classification Search ........ 370/208, 370/210, 335, 342; 375/229–333, 260, 349–350
See application file for complete search history.

(56) References Cited

U.S. PATENT DOCUMENTS

| 5,285,474 | A | 2/1994 | Chow et al. |
| 5,483,529 | A | 1/1996 | Baggen et al. |
| 5,559,830 | A | 9/1996 | Dapper et al. |
| 5,796,814 | A | 8/1998 | Brajal et al. |
| 5,963,592 | A | 10/1999 | Kim |
| 5,987,063 | A | 11/1999 | Rinne |
| 6,061,327 | A | 5/2000 | Demoulin et al. |
| 6,088,398 | A | 7/2000 | Wahlqvist et al. |
| 6,141,393 | A | 10/2000 | Thomas et al. |
| 6,181,714 | B1 | 1/2001 | Isaksson et al. |
| 6,292,511 | B1 | 9/2001 | Goldston et al. |
| 6,295,317 | B1 | 9/2001 | Hartup et al. |
| 6,295,326 | B1 | 9/2001 | Tonissen et al. |
| 6,320,903 | B1 | 11/2001 | Isaksson et al. |
| 6,408,038 | B1 | 6/2002 | Takeuchi |
| 6,643,339 | B1* | 11/2003 | Okanoue et al. ............ 375/349 |
| 2002/0012392 | A1 | 1/2002 | Goldston et al. |
| 2002/0021750 | A1 | 2/2002 | Belotserkovsky et al. |
| 2002/0037058 | A1 | 3/2002 | Birru |
| 2002/0057734 | A1 | 5/2002 | Sandberg et al. |
| 2002/0131537 | A1 | 9/2002 | Storm et al. |
| 2002/0145971 | A1* | 10/2002 | Cho et al. .................. 370/208 |
| 2003/0053564 | A1* | 3/2003 | Kim et al. .................. 375/326 |
| 2004/0233838 | A1* | 11/2004 | Sudo et al. ................ 370/208 |

FOREIGN PATENT DOCUMENTS

CN 421928 2/2001

\* cited by examiner

*Primary Examiner*—Chi Pham
*Assistant Examiner*—Thai Hoang
(74) *Attorney, Agent, or Firm*—Finnegan, Henderson, Farabow, Garrett & Dunner LLP

(57) ABSTRACT

An equalization method suitable for use in a receiver in an orthogonal frequency division multiplexing (OFDM) system utilizing a plurality of sub-carriers. The receiver includes an outer receiver for decoding. The equalization method includes receiving an input signal including at least one preamble symbol containing a training sequence and a plurality of informative OFDM symbols each containing a serial stream of samples, and performing compensations for each of the informative OFDM symbols. Compensation for each of the informative OFDM symbols includes converting the serial stream of samples into parallel samples, performing a fast Fourier transform (FFT) of the parallel samples to obtain a plurality of data symbols, each data symbol corresponding to a sub-carrier, compensating the data symbols for at least one first phase distortion and at least one second phase distortion, and providing at least one amplitude distortion factor to the outer receiver.

23 Claims, 2 Drawing Sheets

METHOD OF EQUALIZATION IN AN OFDM SYSTEM

FIELD OF THE INVENTION

This invention relates in general to an equalizer for an orthogonal frequency division multiplexing (OFDM) system and, more particularly, to a frequency domain equalizer for an OFDM system.

BACKGROUND OF THE INVENTION

In a wireless system, such as a digital audio broadcasting (DAB) system, a digital television system, a wireless local area network, and a wireless asynchronous transfer mode (ATM) system, signals are superimposed onto a carrier wave through signal modulation. Due to the existence of multiple paths between the transmitter and receiver, a signal may arrive at the receiver at different times and therefore, the receiver may receive multiple copies of the signal with different transmission delays. As a result, interference is generated between adjacent portions of the signal, a phenomenon known as inter-symbol interference (ISI), which limits the channel capacity of a wireless system.

One way of overcoming the ISI is an orthogonal frequency division multiplexing (OFDM) technique, which utilizes a plurality of sub-carriers. In an OFDM-based system, a serial data stream is converted into a plurality of parallel data symbols, each data symbol modulating one of the sub-carriers. All the sub-carriers as modulated by the data symbols are then multiplexed onto a carrier frequency, constituting a stream of OFDM symbols, wherein each of the OFDM symbols contains a serial stream of time-domain samples and corresponds to a symbol duration equal to the period of the carrier frequency. The serial stream of samples in each OFDM symbol are then transmitted during the corresponding symbol duration. A guard interval, or a prefix, may be introduced at one or both edges of the OFDM symbols such that ISI only takes place at the guard interval. When the receiver receives the OFDM symbols, the guard interval is removed before the useful data is processed, thereby reducing the effect of ISI.

The sub-carriers in an OFDM system are so spaced from each other that an orthogonality exists between every two sub-carriers, i.e., an integral of a product of any two sub-carriers over a cycle of the fundamental frequency is equal to zero. Accordingly, an inter-carrier interference ("ICI"), which indicates a cross-talk between two sub-carriers, is in theory eliminated. However, if an arbitrary guard interval is introduced into an OFDM symbol, orthogonality between inter-carriers is lost and ICI is not eliminated. A conventional solution is to use a cyclic extension of the OFDM symbol as the guard interval to preserve the orthogonality.

Other than the above-mentioned ISI and ICI, a signal transmitted in an OFDM system may experience other distortions, in amplitude and/or in phase. The causes for such distortions include channel effect, carrier frequency offset, and sampling frequency offset, etc. Both carrier frequency offset and sampling frequency offset result in a phase distortion and ICI.

The distortions due to the channel effect, carrier frequency offset, and sampling frequency offset may be eliminated by an equalizer that modifies the amplitude and/or phase of the received data adaptively, for example, by multiplying the received data with a coefficient that includes an amplitude compensation factor and/or a phase compensation factor. An OFDM system may incorporate training sequences, which may be used to determine the compensation factors. The training sequences may be introduced in the OFDM system as a preamble, which is inserted before the transmission of actual data, or as pilot data symbols, which are periodically inserted either in certain sub-carriers of each OFDM symbol or in all of the sub-carriers for a specific period.

Three conventional equalizers are generally known: a time-domain equalizer that operates solely in the time domain, a frequency-domain equalizer that operates solely in the frequency domain, and a time-frequency hybrid equalizer that operates in both time and frequency domains. Due to the inherent characteristics of the OFDM technique, a frequency-domain equalizer is preferred.

However, conventional equalizers generally address only one cause of the distortion. Moreover, to obtain the coefficients, a conventional equalizer either directly divides the expected symbol data by the received symbol data, or estimates the coefficients through a digital signal processing (DSP) algorithm, e.g., least-mean-square (LMS) estimate. As is known in the art, division operations are difficult to implement in hardware, and the LMS estimate requires a lengthy iterative process.

SUMMARY OF THE INVENTION

It is therefore an object of the present invention to provide an equalizer to be used in an OFDM system to compensate for signal distortions due to at least channel effect, carrier frequency offset, and sampling frequency offset.

In accordance with the present invention, there is provided an equalization method suitable for use in a receiver in an orthogonal frequency division multiplexing (OFDM) system utilizing a plurality of sub-carriers, wherein the receiver includes an outer receiver for decoding. The equalization method includes receiving an input signal including at least one preamble symbol containing a training sequence and a plurality of informative OFDM symbols each containing a serial stream of samples, and performing compensations for each of the informative OFDM symbols. Compensation for each of the informative OFDM symbols includes converting the serial stream of samples into parallel samples, performing a fast Fourier transform (FFT) of the parallel samples to obtain, in the frequency spectrum, a plurality of data symbols, wherein each data symbol corresponds to a sub-carrier, compensating the data symbols for at least one first phase distortion, and compensating the data symbols for at least one second distortion. The equalization method also includes providing at least one amplitude distortion factor to the outer receiver.

Also in accordance with the present invention, there is provided an equalization method suitable for use in a receiver in an orthogonal frequency division multiplexing (OFDM) system utilizing a plurality of sub-carriers. The equalization method includes receiving an input signal including at least one preamble symbol containing a training sequence and a plurality of informative OFDM symbols each containing a serial stream of samples and performing compensations for the informative OFDM symbols. Compensation for each of the informative OFDM symbols further includes converting the serial stream of samples into parallel samples, performing a fast Fourier transform (FFT) of the parallel samples to obtain, in the frequency spectrum, a plurality of data symbols, wherein each data symbol corresponds to a sub-carrier, compensating the data symbols for at least one first phase distortion, compensating the data symbols for at least one second phase distortion, and compensating the data symbols for at least one amplitude distortion.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is incorporated in and constitutes a part of this specification, illustrates an embodiment of the invention and, together with the description, serves to explain the objects, advantages, and principles of the invention.

In the drawing.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

According to the present invention, there is provided a method of equalization suitable for use in an OFDM system to compensate for signal distortions caused by the channel effect, carrier frequency offset and sampling frequency offset. The OFDM system includes at least a transmitter and a receiver, and utilizes K sub-carriers, where K is generally an integer power of 2. The receiver includes an equalizer for equalization and an outer receiver for decoding. A signal transmitted by the transmitter may comprise a plurality of OFDM symbols. Each OFDM symbol contains a serial stream of samples representing K data symbols, wherein each data symbol corresponds to the coefficient of a sub-carrier in the spectrum of the OFDM symbol. A preamble may include one or more OFDM symbols composed of training sequences, and may precede the transmission of the OFDM symbols that contain useful data ("informative OFDM symbols"). The OFDM symbols may also contain a plurality of pilot data symbols. The receiver receives signal, and processes the received data and information.

Figure 1:
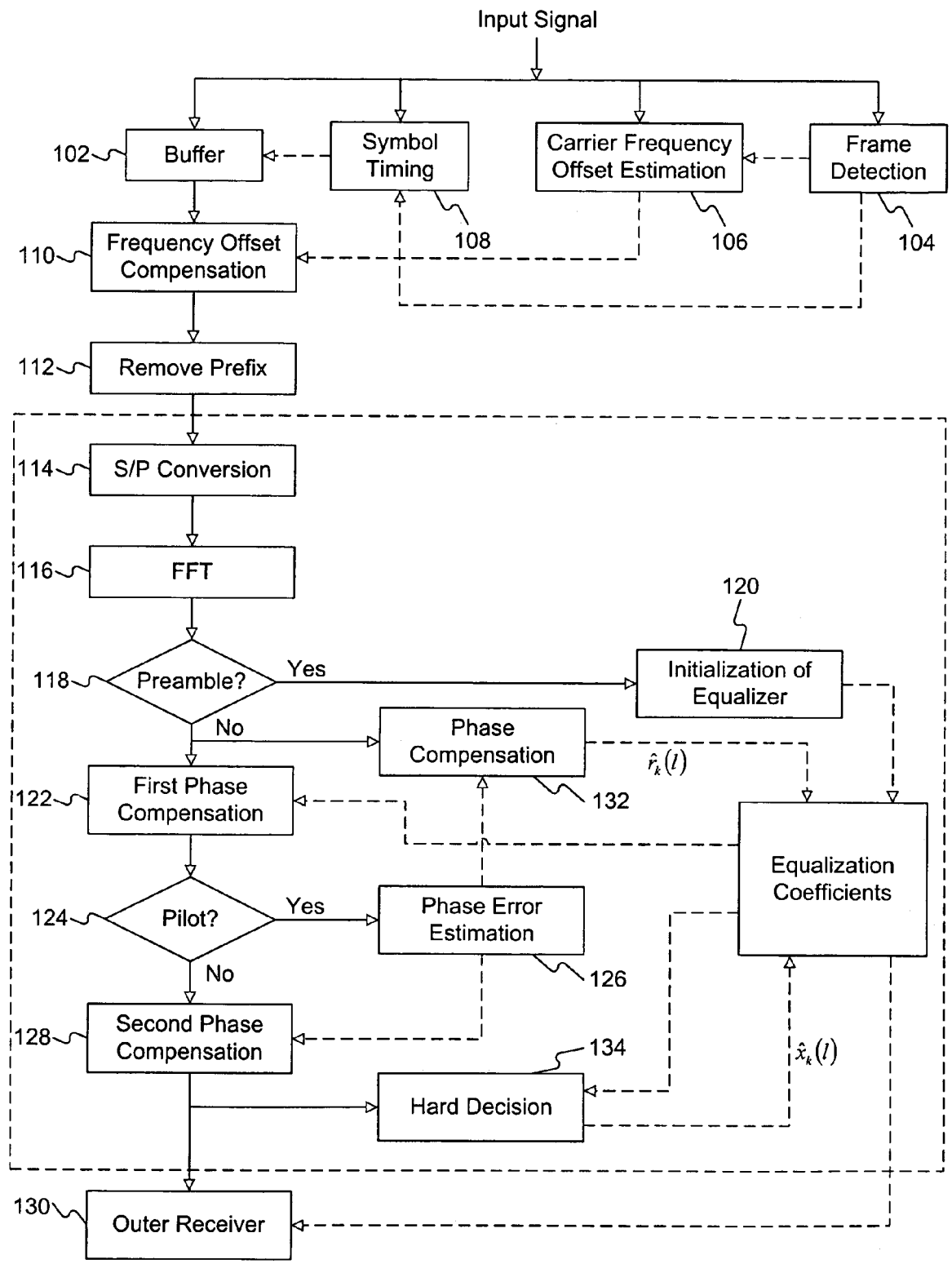
FIG. 1 is a flowchart of an equalization method consistent with a first embodiment of the present invention.

FIG. 1 is a flowchart showing the data processing steps of the receiver, wherein the equalizer of the receiver utilizes the equalization method consistent with a first embodiment of the present invention. For illustration purposes, the solid arrows in FIG. 1 indicate the flow of the signal or data, and the dashed arrows indicate that the result or parameter of the previous step is used in the next step.

The equalizer has stored therein equalization coefficients, which include at least one phase compensation factor and at least one amplitude compensation factor. A box labeled "Equalization Coefficients" (not numbered) is shown in FIG. 1 for illustration purposes. An arrow pointing to the "Equalization Coefficients" box indicates that a step or process updates at least one of the coefficients, while an arrow pointing away from the "Equalization Coefficients" box indicates that at least one of the coefficients stored in the equalizer is used for a step or a process.

Referring to FIG. 1, an input signal is received at the receiver and is provided to a buffer at step 102. Conventional signal processing steps are sequentially performed on the input signal, including frame detection at step 104, carrier frequency offset estimation at step 106, and symbol timing at step 108. As shown in FIG. 1, the result or parameter of the frame detection at step 104 is used at step 106 for carrier frequency offset estimation, and the result of carrier frequency offset estimation is used at step 108 for symbol timing. The OFDM symbols are read out of the buffer based on the timing information obtained at step 108. At step 110, a compensation operation is performed on the OFDM symbols based on the result or parameter of carrier frequency offset estimation at step 106. Then, prefixes are removed at step 112. Steps 102, 104, 106, 110, and 112 are well known to one skilled in the art and are not described in detail herein.

After the prefixes are removed at step 112, each of the OFDM symbols is provided to the equalizer for equalization. The steps performed by the equalizer are those enclosed by the dashed frame, including steps 114, 116, 118, 120, 122, 124, 126, 128, 132, and 134. The same steps are repeated for each OFDM symbol received at the receiver and therefore, only one OFDM symbol is considered in the following descriptions.

The equalization process begins with a serial/parallel conversion of the OFDM symbol at step 114, which converts the serial samples contained in the OFDM symbol into parallel samples. A fast Fourier transform (FFT) at step 116 is performed on the parallel samples to obtain a frequency spectrum of the sub-carriers, wherein the coefficients of the sub-carriers correspond to the data symbols of the received OFDM symbol. If the OFDM symbol is a preamble symbol, the obtained data symbols correspond to the training sequence of the preamble. Unless otherwise specified herein, all subsequent steps are performed in the frequency domain.

At step 118, a determination is made on whether the OFDM symbol is a preamble symbol. If affirmative, the training sequence of the preamble symbol is used to initialize the equalizer at step 120. The equalizer estimates at least one first phase distortion and/or at least one amplitude distortion, and computes at least one initial first phase compensation factor and/or at least one initial amplitude compensation factor by comparing the received training sequence with the training sequence stored in the equalizer. The initial values of the at least one first phase compensation factor and/or the at least one amplitude compensation factor may be computed using any conventional estimation method, such as mean value. For a signal containing M preamble symbols, an example of calculating the initial compensation factors for the k-th sub-carrier may be given by (1):

$$p_k(0) = \frac{s_k^*(m)}{M} \sum_{m=0}^{M-1} r_k(m), \tag{1}$$

$$q_k(0) = \frac{1}{M} \sum_{m=0}^{M-1} r_k(m) r_k^*(m),$$

wherein k=0, 1, 2, . . . , K−1, m=0, 1, 2, . . . , M−1, $p_k(0)$ is the initial first phase compensation factor, $q_k(0)$ is the initial amplitude compensation factor, $s_k(m)$ is the coefficient of the k-th sub-carrier of the m-th stored preamble symbol, and $r_k(m)$ is the coefficient of the k-th sub-carrier of the m-th received preamble symbol.

An OFDM system generally uses 1 or 2 preamble symbols, and the number of sub-carriers is generally an integer power of 2. For example, in an IEEE 802.11a system, M=2, K=64 (52 out of 64 carriers actually carry information). Under such circumstances, direct division operation is generally not required in calculating the initial compensation factors.

The at least one initial first phase compensation factor and/or the at least one initial amplitude compensation factor are then stored in the equalizer, and are used for compensation of the data symbols.

In the above description, step 118 is performed after the FFT operation at step 116. However, whether an OFDM symbol is a preamble may also be determined prior to the FFT operation, in which case if an OFDM symbol is a preamble symbol, FFT is performed on the preamble symbol to obtain the training sequence, which are then used to initialize the equalizer. If the OFDM symbol is an informative OFDM symbol, FFT is performed on the OFDM symbol to obtain the data symbols prior to proceeding to the next steps of compensation.

The initial compensation factors obtained at step 120 will be used to compensate data symbols of the OFDM symbol received immediately after the preamble. The compensation factors are adaptively updated, and the compensation factors updated during the compensation for the data symbols of an OFDM symbol received at an earlier time period are used to compensate for the data symbols of the OFDM symbol received at a later time period.

For the data symbols in an informative OFDM symbol, a first phase compensation is provided at step 122, wherein each of the data symbols is multiplied by the at least one first phase compensation factor stored in the equalizer. If the OFDM system contains certain frequency-domain guard bands, i.e., frequency bands kept unused to prevent inter-channel interferences, phase compensation is not necessary for the part of the spectrum that corresponds to the guard bands. In other words, it is sufficient to perform phase compensation only to the sub-carriers that carry information. In one aspect, the first phase compensation factor stored in the equalizer is determined from the preamble or the data symbols of an OFDM symbol received during an earlier time period.

After the first phase compensation at step 122, a determination is made at step 124 on whether the data symbols are pilot symbols. Pilot symbols are selected for estimating at least one second phase distortion at step 126. The estimation can be made, for example, by averaging the phase distortions of all the pilot symbols.

Then, the at least one second phase distortion obtained at step 126 is used in a second phase compensation at step 128 for data symbols containing information, or non-pilot data symbols. If the phase distortion is θ, then a second phase compensation factor, exp(−jθ), is multiplied onto each of the non-pilot data symbols at step 128. Similarly, the second phase compensation operation is not necessary for guard bands.

At step 130, the data symbols that have gone through the first and second phase compensations are outputted, together with the at least one amplitude compensation factor stored in the equalizer, to an outer receiver. A Viterbi decoder (not shown) in the outer receiver then adjusts the weight of each data symbol based on the at least one amplitude compensation factor to compensate for at least one amplitude distortion. A Viterbi decoder is well-known to one skilled in the art and will not be described in detail herein.

Therefore, the equalizer according to the first embodiment of the present invention provides compensation for the phase distortions due to channel effect, sampling frequency offset, and carrier frequency offset, etc. Residual carrier frequency offset is also compensated for. The amplitude compensation is performed outside the equalizer in the outer receiver at step 130.

At the same time compensation is performed on the received OFDM symbols, the data symbols are also used to update equalization coefficients. Referring again to FIG. 1, the update of the equalization coefficients may be realized through steps 132 and 134, as described below.

At step 132, prior to the first phase compensation, each data symbol is multiplied by the second phase compensation factor, exp(−jθ), which is estimated at an earlier time, and the result is denoted $\hat{r}_k(l)$, wherein k is the index of the sub-carrier corresponding to the data symbol, and l is the index of the OFDM symbol received at the receiver.

At step 134, the signal constellation used in the OFDM system is first adjusted using the at least one amplitude compensation factor stored in the equalizer. Then, the adjusted constellation is used to perform a hard decision on each data symbol after the data symbol has gone through the second phase compensation. Alternatively, rather than adjusting the constellation, it is also possible to directly divide the data symbols that have gone through the second phase compensation by the at least one amplitude compensation factor stored in the equalizer, and then perform the hard decision by comparing the resultant data symbols against the constellation. However, the division operation increases hardware complexity.

After the hard decision, the result of the hard decision, $\hat{x}_k(l)$, together with $\hat{r}_k(l)$, is used to update the equalization coefficients. Any applicable adaptive signal processing (ASP) method may be used for such updates of the at least one phase compensation factor and/or the at least one amplitude compensation factor. One example of the update method is given in (2):

$$p_k(l) = (1-\alpha)p_k(l-1) + \alpha \hat{x}_k^*(l)\hat{r}_k(l), \qquad (2)$$

$$q_k(l) = (1-\alpha)q_k(l-1) + \alpha \hat{r}_k^*(l)\hat{r}_k(l),$$

wherein $p_k(l)$ and $q_k(l)$ are the at least one phase compensation factor and the at least one amplitude compensation factor, respectively, for the k-th sub-carrier of the l-th OFDM symbol, and α is a coefficient that may be different for different OFDM systems or different sub-carriers in an OFDM system. α may also be adaptively updated in an OFDM system. In one aspect, α has a fixed value, e.g., ½. A properly chosen α may facilitate the compensation for the phase distortion.

By separately updating the amplitude compensation factor and the phase compensation factor, it is possible to avoid a division operation, which is complex to realize in hardware.

Although only channel effect, sampling frequency offset, carrier frequency offset, and residue carrier frequency offset were discussed as the causes for the distortions, it is to be understood that distortions due to other causes may also be compensated for by the present invention.

Figure 2:
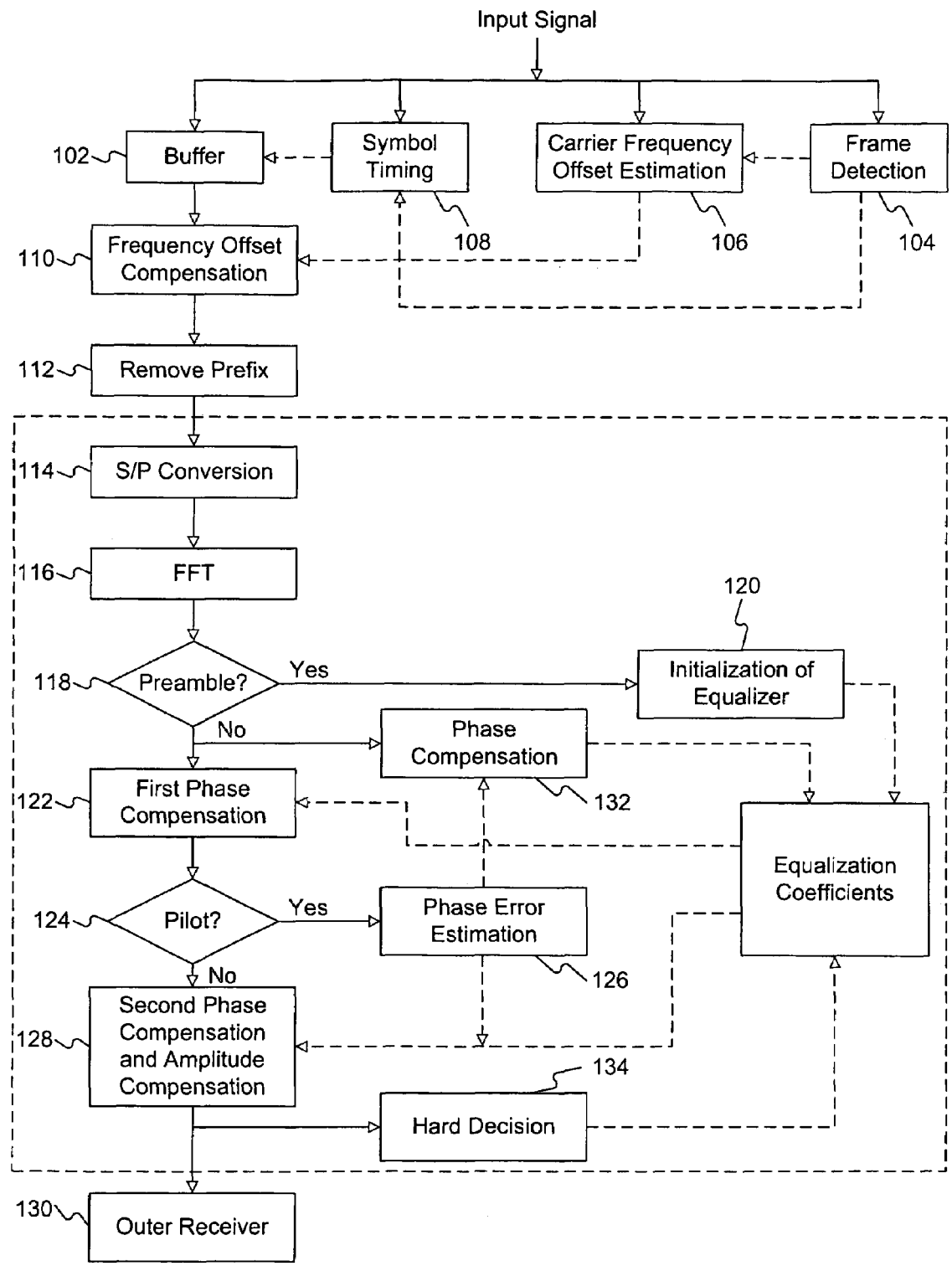
FIG. 2 is a flowchart of an equalization method consistent with a second embodiment of the present invention.

Alternatively, FIG. 2 shows an equalization method according to a second embodiment of the present invention, wherein the equalizer of the receiver compensates for both at least one amplitude distortion and at least one phase distortion. Similar steps are labeled with the same reference numerals as those shown in FIG. 1.

Referring to FIG. 2, using the second phase compensation factor obtained at step 126 and the at least one amplitude compensation factor stored in the equalizer, the data symbols of an OFDM symbol are compensated for both the at least one second amplitude distortion and the at least one second phase distortion at step 128, as compared to the compensation for only the at least one second phase distortion at step 128 in the first embodiment as shown in FIG. 1. After step 128 of both amplitude and phase compensations, the data symbols bearing the at least one compensated amplitude are used for hard decision at step 134, as well as outputted to the outer receiver at step 130.

Similarly, in the second embodiment of the present invention, the amplitude compensation may be performed at step 122 instead of step 128. Thus, at step 122, the data symbols will be compensated for the at least one first phase distortion and the at least one amplitude distortion using the at least one first phase compensation factor and the at least one amplitude compensation factor stored in the equalizer, while at step 128, the data symbols are compensated for the at least one second phase distortion.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An equalization method suitable for use in a receiver in an orthogonal frequency division multiplexing (OFDM) system utilizing a plurality of sub-carriers, wherein the receiver includes an outer receiver for decoding, the method comprising:
   receiving an input signal including at least one preamble symbol containing a training sequence and a plurality of informative OFDM symbols each containing a serial stream of samples;
   performing compensations for each of the informative OFDM symbols, including
       converting the serial stream of samples into parallel samples,
       performing a fast Fourier transform (FFT) of the parallel samples to obtain, in the frequency spectrum, a plurality of data symbols, wherein each data symbol corresponds to a sub-carrier,
       compensating the data symbols for at least one first phase distortion,
       compensating the data symbols for at least one second phase distortion; and
   providing at least one amplitude distortion factor to the outer receiver.

2. The method of claim 1, wherein the training sequence is stored in the receiver, the method further comprising
   obtaining the training sequence in the received preamble by performing an FFT on the preamble symbol;
   determining initial values of at least one amplitude compensation factor and/or at least one first phase compensation factor by comparing the received training sequence and the training sequence stored in the receiver; and
   storing the at least one initial amplitude compensation factor and/or the at least one initial first phase compensation factor in the receiver,
   wherein compensating the data symbols in a first informative OFDM symbol for the at least one first phase distortion comprises multiplying each data symbol of the first informative OFDM symbol with the at least one initial first phase compensation factor.

3. The method of claim 1, wherein the frequency spectrum of the OFDM symbol includes a first part corresponding to useful data and a second part corresponding to at least one guard band, and wherein compensating the data symbols for the at least one first phase distortion comprises multiplying the data symbols in the first part of the frequency spectrum by a first phase compensation factor.

4. The method of claim 3, wherein the data symbols of at least one of the informative OFDM symbols include one or more pilot data symbol and a plurality of non-pilot data symbols, wherein the pilot data symbol is stored in the receiver, the method further comprising
   determining the at least one second phase distortion based on the received pilot data symbol after being compensated for the at least one first phase distortion and the stored pilot data symbol;
   obtaining at least one second phase compensation factor corresponding to the at least one second phase distortion; and
   compensating the non-pilot data symbols for the at least one second phase distortion using the at least one second phase compensation factor.

5. The method of claim 4, wherein the frequency spectrum of the OFDM symbol includes a first part corresponding to useful data and a second part corresponding to at least one guard band, and wherein compensating the data symbols for the at least one second phase distortion comprises multiplying the data symbols in the first part of the frequency spectrum by the second phase compensation factor.

6. The method of claim 4, further comprising updating the at least one amplitude compensation factor during compensating the data symbols of an informative OFDM symbol for the at least one second phase distortion.

7. The method of claim 6, wherein the at least one amplitude compensation factor is updated according to the following:

$q_k(l)=(1-\alpha)q_k(l-1)+\alpha \hat{r}_k^*(l)\hat{r}_k(l)$, wherein k is index of the sub-carriers, l is the index of the OFDM symbols, $q_k(l)$ and $\hat{r}_k(l)$ are the at least one amplitude compensation factor and a result of the compensation for the at least one second phase distortion, respectively, for the k-th sub-carrier of the l-th OFDM symbol, and $\alpha$ is a coefficient.

8. The method of claim 4, further comprising performing a hard decision on the data symbols that have gone through the compensation for the at least one second phase distortion using the at least one amplitude compensation factor.

9. The method of claim 8, wherein the at least one first phase compensation factor is updated according to the following:

$$p_k(l) = (1-\alpha)p_k(l-1) + \alpha \hat{x}_k^*(l)\hat{r}_k(l),$$

wherein k is index of the sub-carriers, l is the index of the OFDM symbols, $p_k(l)$, $\hat{x}_k(l)$, and $\hat{r}_k(l)$ are the at least one first phase compensation factor, the result of the hard decision, and a result of the compensation for the at least one second phase distortion, respectively, for the k-th sub-carrier of the l-th OFDM symbol, and α is a coefficient.

10. The method of claim 9, wherein compensating the data symbols of an OFDM symbol received at a later time period comprises compensating for the at least one first phase distortion using the at least one first phase compensation factor updated during compensating the data symbols of an OFDM symbol received at an earlier time period.

11. The method of claim 1, wherein compensating for the at least one amplitude distortion is performed in the outer receiver.

12. An equalization method suitable for use in a receiver in an orthogonal frequency division multiplexing (OFDM) system utilizing a plurality of sub-carriers, the method comprising:
receiving an input signal including at least one preamble symbol containing a training sequence and a plurality of informative OFDM symbols each containing a serial stream of samples; and
performing compensations for each of the informative OFDM symbols, including
converting the serial stream of samples into parallel samples,
performing a fast Fourier transform (FFT) of the parallel samples to obtain, in the frequency spectrum, a plurality of data symbols, wherein each data symbol corresponds to a sub-carrier,
compensating the data symbols for at least one first phase distortion,
compensating the data symbols for at least one second phase distortion, and
compensating the data symbols for at least one amplitude distortion.

13. The method of claim 12, wherein the training sequence is stored in the receiver, the method further comprising
obtaining the training sequence in the received preamble by performing an FFT on the preamble symbol;
determining initial values of at least one amplitude compensation factor and/or at least one first phase compensation factor by comparing the received training sequence and the training sequence stored in the receiver; and
storing the at least one initial amplitude compensation factor and/or the at least one initial first phase compensation factor in the receiver,
wherein compensating the data symbols in a first informative OFDM symbol for the at least one first phase distortion comprises multiplying each data symbol of the first informative OFDM symbol with the at least one initial first phase compensation factor.

14. The method of claim 12, wherein the frequency spectrum of the OFDM symbol includes a first part corresponding to useful data and a second part corresponding to at least one guard band, and wherein compensating the data symbols for the at least one first phase distortion comprises multiplying the data symbols in the first part of the frequency spectrum by a first phase compensation factor.

15. The method of claim 14, wherein the data symbols of at least one of the informative OFDM symbols include one or more pilot data symbol and a plurality of non-pilot data symbols, wherein the pilot data symbol is stored in the receiver, the method further comprising
determining the at least one second phase distortion based on the received pilot data symbol after being compensated for the at least one first phase distortion and the stored pilot data symbol;
obtaining at least one second phase compensation factor corresponding to the at least one second phase distortion; and
compensating the non-pilot data symbols for the at least one second phase distortion using the at least one second phase compensation factor.

16. The method of claim 15, wherein the frequency spectrum of the OFDM symbol includes a first part corresponding to useful data and a second part corresponding to at least one guard band, and wherein compensating the data symbols for the at least one second phase distortion comprises multiplying the data symbols in the first part of the frequency spectrum by the second phase compensation factor.

17. The method of claim 15, further comprising updating the at least one amplitude compensation factor during compensating the data symbols of an informative OFDM symbol for the at least one second phase distortion.

18. The method of claim 17, wherein the at least one amplitude compensation factor is updated according to the following:
$q_k(l)=(1-\alpha)q_k(l-1)+\alpha \hat{r}_k^*(l)\hat{r}_k(l)$, wherein k is index of the sub-carriers, l is the index of the OFDM symbols, $q_k(l)$ and $\hat{r}_k(l)$ are the at least one amplitude compensation factor and a result of the compensation for the at least one second phase distortion, respectively, for the k-th sub-carrier of the l-th OFDM symbol, and α is a coefficient.

19. The method of claim 15, further comprising performing a hard decision on the data symbols that have gone through the compensation for the at least one second phase distortion.

20. The method of claim 19, wherein the at least one first phase compensation factor is updated according to the following:

$$p_k(l) = (1-\alpha)p_k(l-1) + \alpha \hat{x}_k^*(l)\hat{r}_k(l),$$

wherein k is index of the sub-carriers, l is the index of the OFDM symbols, $p_k(l)$, $\hat{x}_k(l)$, and $\hat{r}_k(l)$ are the at least one first phase compensation factor, the result of the hard decision, and a result of the compensation for the at least one second phase distortion, respectively, for the k-th sub-carrier of the l-th OFDM symbol, and α is a coefficient.

21. The method of claim 20, wherein compensating the data symbols of an OFDM symbol received at a later time period comprises compensating for the at least one first phase distortion using the at least one first phase compensation factor updated during compensating the data symbols of an OFDM symbol received at an earlier time period.

22. The method of claim 12, wherein compensating for the at least one first phase distortion and compensating for the at least one amplitude distortion are performed simultaneously.

23. The method of claim 12, wherein compensating for the at least one second phase distortion and compensating for the at least one amplitude distortion are performed simultaneously.

* * * * *